(12) United States Patent
Otozai

(10) Patent No.: US 10,001,177 B2
(45) Date of Patent: Jun. 19, 2018

(54) IRREVERSIBLE MECHANISM

(71) Applicant: Shimadzu Corporation, Kyoto-shi (JP)

(72) Inventor: Keitaro Otozai, Ibaraki (JP)

(73) Assignee: Shimadzu Corporation,
Nishinokyo-Kuwabaracho, Nakagyo-ku,
Kyoto-shi, Kyoto (JP)

( * ) Notice: Subject to any disclaimer, the term of this patent is extended or adjusted under 35 U.S.C. 154(b) by 0 days. days.

(21) Appl. No.: 15/306,649

(22) PCT Filed: Apr. 25, 2014

(86) PCT No.: PCT/JP2014/061765
§ 371 (c)(1),
(2) Date: Oct. 25, 2016

(87) PCT Pub. No.: WO2015/162791
PCT Pub. Date: Oct. 29, 2015

(65) Prior Publication Data
US 2017/0051798 A1   Feb. 23, 2017

(51) Int. Cl.
*F16D 41/063* (2006.01)
*F16D 63/00* (2006.01)
*F16H 35/00* (2006.01)
*F16D 41/02* (2006.01)
*F16D 41/064* (2006.01)
*F16D 41/22* (2006.01)

(52) U.S. Cl.
CPC ........... *F16D 41/063* (2013.01); *F16D 41/02* (2013.01); *F16D 41/064* (2013.01); *F16D 41/22* (2013.01); *F16D 63/00* (2013.01); *F16H 35/00* (2013.01)

(58) Field of Classification Search
CPC ...... F16D 41/02; F16D 41/063; F16D 41/064; F16D 41/0646; F16D 41/22

USPC .................... 188/82.1, 82.8, 82.84
See application file for complete search history.

(56) References Cited

U.S. PATENT DOCUMENTS 2,783,861 A * 3/1957 Jungles .................. F16D 59/00
                                                    188/134
5,299,676 A * 4/1994 Wade ..................... B65G 23/26
                                                    188/134

FOREIGN PATENT DOCUMENTS

| EP | 0528638 A1 | 2/1993 |
| JP | S49-025346 A | 3/1974 |
| JP | 2007-332966 A | 12/2002 |
| JP | 2006057688 A * | 3/2006 |

(Continued)

OTHER PUBLICATIONS

International Search Report dated Aug. 5, 2015, PCT/JP2014/061765.

(Continued)

*Primary Examiner* — Thomas J Williams
(74) *Attorney, Agent, or Firm* — Muir Patent Law, PLLC

(57) ABSTRACT

This irreversible mechanism (1) includes a rotatable input shaft (3), an output shaft (4) that rotates according to the input shaft, a conversion mechanism (5) that converts back drive torque from an output shaft side to an axial force, a brake portion (6) that includes a first brake surface (61), and a second brake surface (56) provided to rotate integrally with the output shaft and pressed against the first brake surface according to the axial force of the conversion mechanism. The first brake surface and the second brake surface include taper surfaces tapered in the action direction of the axial force of the conversion mechanism.

18 Claims, 5 Drawing Sheets

(56) References Cited

FOREIGN PATENT DOCUMENTS

JP     2006-312963 A    11/2006
JP     2007-120535 A     5/2007

OTHER PUBLICATIONS

Written Opinion by the International Search Authority dated Jul. 24, 2014 in PCT/JP2014/061765.
Extended European Search Report dated Apr. 18, 2017 in corresponding European patent application No. 14890408.9.

* cited by examiner

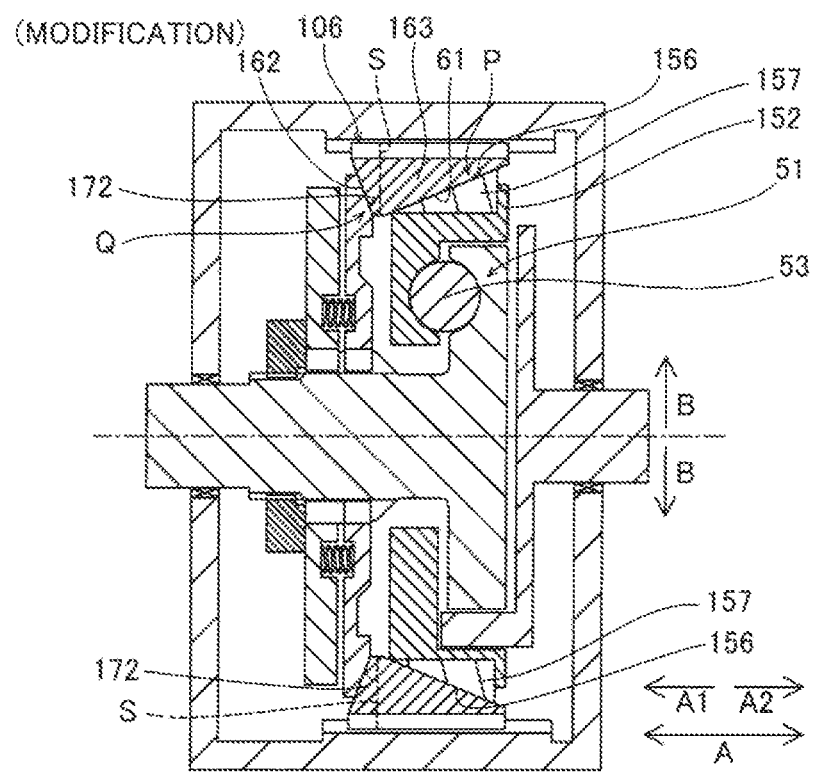
FIG.8 (MODIFICATION)

IRREVERSIBLE MECHANISM

TECHNICAL FIELD

The present invention relates to an irreversible mechanism, and more particularly, it relates to an irreversible mechanism that prevents transmission, to an input shaft side, of back drive torque to be transmitted from an output shaft side.

BACKGROUND ART

In general, an irreversible mechanism that prevents transmission, to an input shaft side, of back drive torque to be transmitted from an output shaft side is known. Such an irreversible mechanism is disclosed in Japanese Patent Laying-Open No. 2007-332986, for example.

An irreversible mechanism disclosed in the aforementioned Japanese Patent Laying-Open No. 2007-332986 includes an input shaft, an output shaft, a multi-plate brake, and a screw feed mechanism that connects the output shaft to the multi-plate brake. The multi-plate brake includes multiple first friction plates mounted on a housing and multiple second friction plates mounted on the screw feed mechanism. The first friction plates and the second friction plates each are provided along a radial direction and are alternately aligned in an axial direction. When back drive torque acts on the output shaft, the screw feed mechanism translates rotation of the output shaft to axial displacement, and the second friction plates are pressed against the first friction plates. Thus, when back drive torque acts on the output shaft, the output shaft is fixed, and transmission of back drive torque to an input shaft side is prevented.

This irreversible mechanism is applied to a power transmission system of an aircraft, a general industrial machine, or the like. For example, in the aircraft, the irreversible mechanism is applied to a rudder face (flap) driving device for steering, and transmission of back drive torque from a rudder face side (output shaft side) to an input shaft side can be prevented.

PRIOR ART

Patent Document
Patent Document 1: Japanese Patent Laying-Open No. 2007-332986

SUMMARY OF THE INVENTION

Problems to be Solved by the Invention

In the irreversible mechanism according to the aforementioned Japanese Patent Laying-Open No. 2007-332986, the multi-plate brake includes the multiple (a number of) friction plates, and hence the number of components tends to be increased. Furthermore, in the irreversible mechanism according to the aforementioned Japanese Patent Laying-Open No. 2007-332986, the multiple friction plates of the multi-plate brake are aligned along the axial direction, and hence the entire length of the irreversible mechanism in the axial direction tends to be increased. Thus, as the irreversible mechanism, it is preferable to simplify its structure by suppressing an increase in the number of components and reduce its entire length in the axial direction.

Particularly when the irreversible mechanism is applied to the power transmission system of the aircraft, it is important to reduce the size and weight of the irreversible mechanism by reducing the entire length of the irreversible mechanism in consideration of the influence on fuel consumption. Furthermore, the emphasis is particularly on safety in the aircraft field, and hence it is important to simplify the structure of the irreversible mechanism by reducing the number of components in order to improve the reliability of the irreversible mechanism.

The present invention has been proposed in order to solve the aforementioned problems, and an object of the present invention is to provide an irreversible mechanism capable of reducing its entire length in an axial direction while simplifying its structure by suppressing an increase in the number of components.

Means for Solving the Problems

In order to attain the aforementioned object, an irreversible mechanism according to an aspect of the present invention includes a rotatable input shaft, an output shaft that rotates according to the input shaft, a conversion mechanism that is connected to the output shaft and converts back drive torque from an output shaft side to an axial force, a brake portion that includes a first brake surface and is unrotatably provided, and a second brake surface that faces the first brake surface, is provided to rotate integrally with the output shaft, and is pressed against the first brake surface according to the axial force of the conversion mechanism, and the first brake surface and the second brake surface include taper surfaces tapered in the action direction of the axial force of the conversion mechanism.

As hereinabove described, the irreversible mechanism according to this aspect of the present invention is provided with the brake portion that includes the first brake surface and is unrotatably provided, and the second brake surface that faces the first brake surface, is provided to rotate integrally with the output shaft, and is pressed against the first brake surface according to the axial force of the conversion mechanism. Furthermore, the first brake surface and the second brake surface include the taper surfaces tapered in the action direction of the axial force of the conversion mechanism. Thus, friction torque (braking torque) can be generated by causing the axial force to act such that the second brake surface is pressed against the first brake surface including the taper surface, which is tapered, when the back drive torque acts on the output shaft. Consequently, large friction torque (braking torque) can be generated between the first brake surface and the second brake surface on the output shaft side by the so-called boosting effect of the taper surfaces. Thus, sufficient friction torque (braking torque) can be generated without providing a number of friction plates, unlike a structure including a multi-plate brake in which multiple (a number of) friction plates along a radial direction are pressed against each other in an axial direction. Consequently, according to the present invention, the structure of the irreversible mechanism can be simplified by suppressing an increase in the number of components, and the entire length of the irreversible mechanism in an axial direction can be reduced. Thus, the weight of the irreversible mechanism can be reduced by reducing the entire length of the irreversible mechanism, and the reliability of the irreversible mechanism can be improved by simplifying the structure. Therefore, according to the present invention, the irreversible mechanism that meets a requirement specific to the aircraft field in which the emphasis is particularly on fuel consumption (reduction in size and weight) and safety (high reliability), can be provided.

In the aforementioned irreversible mechanism according to this aspect, the conversion mechanism preferably includes a first member provided on the output shaft side, a second member provided on a second brake surface side, and an intermediate member arranged between the first member and the second member, and the first brake surface and the second brake surface are preferably arranged outward of the intermediate member in a radial direction. According to this structure, a distance (radius) of the first brake surface and the second brake surface, which are locations at which friction torque is generated, from the output shaft can be increased. Consequently, friction torque (braking torque) can be increased. Thus, larger friction torque (braking torque) can be generated while the simplified structure having a reduced entire length in the axial direction is achieved.

In this case, the first brake surface and the second brake surface are preferably arranged at a position that overlaps with the conversion mechanism in an axial direction. According to this structure, the entire length of the irreversible mechanism in the axial direction can be further reduced while the distance (radius) of the first brake surface and the second brake surface from the output shaft is increased.

In the aforementioned structure in which the first brake surface and the second brake surface are arranged at the position that overlaps with the conversion mechanism in the axial direction, the second brake surface is preferably integrally provided on the second member of the conversion mechanism. According to this structure, it is not necessary to separately provide a brake member formed with the second brake surface, and hence the number of components can be reduced. Thus, the structure can be further simplified by reducing the number of components.

In this case, the conversion mechanism is preferably a ball ramp mechanism that includes a pair of cam members including ball ramp portions as the first member and the second member and a ball arranged in the ball ramp portions between the pair of cam members as the intermediate member, the first brake surface is preferably provided on the circumferential inner peripheral surface of the brake portion, and the second brake surface is preferably formed on the circumferential outer peripheral surface of one of the cam members. According to this structure, a structure to convert the back drive torque to the axial force can be easily and compactly obtained with the ball ramp mechanism. In addition, the first brake surface and the second brake surface can be circumferentially formed. Thus, a contact area between the first brake surface and the second brake surface can be easily increased. Consequently, even when large friction torque is generated, an increase in a contact surface pressure between the first brake surface and the second brake surface can be effectively suppressed.

The aforementioned irreversible mechanism according to this aspect preferably further includes a third brake surface unrotatably provided, and a fourth brake surface provided to rotate integrally with the output shaft without the conversion mechanism and pressed against the third brake surface by the axial force of the conversion mechanism. According to this structure, friction torque (braking torque) can be generated between the third brake surface and the fourth brake surface when the back drive torque acts on the output shaft. Thus, torque input from the output shaft into the conversion mechanism can be reduced by the generated friction torque (braking torque). Consequently, the axial force to be applied from the conversion mechanism to the second brake surface is also reduced, and hence the friction torque (braking torque) between the first brake surface and the second brake surface can also be reduced. When the input shaft is rotated in the same direction as the back drive torque during operation of the irreversible mechanism (during so-called assistance driving), it is only required to input, into the input shaft, drive torque having magnitude corresponding to a difference between the torque input from the output shaft into the conversion mechanism and the friction torque (braking torque) between the first brake surface and the second brake surface. Therefore, the magnitude of the friction torque can be reduced, and hence even when the friction coefficient of the first brake surface or the second brake surface is fluctuated, for example, the fluctuation range of the friction torque can be suppressed to be small. Consequently, fluctuation in the drive torque required during the assistance driving is suppressed.

In this case, the first brake surface and the third brake surface each are preferably provided on the brake portion. According to this structure, the first brake surface and the third brake surface can be formed on the shared brake portion. Thus, even when the third brake surface in addition to the first brake surface is provided, an increase in the number of components can be suppressed.

In the aforementioned irreversible mechanism according to this aspect, the brake portion preferably consists of a single member. According to this structure, an increase in the number of components can be suppressed, unlike a structure including a multi-plate brake in which a number of friction plates along a radial direction are pressed against each other in an axial direction. Consequently, the structure can be further simplified.

Effect of the Invention

As hereinabove described, according to the present invention, the structure of the irreversible mechanism can be simplified by suppressing an increase in the number of components, and the entire length of the irreversible mechanism in the axial direction can be reduced.

BRIEF DESCRIPTION OF THE DRAWINGS

FIG. 8 A schematic view showing a modification of the irreversible mechanism according to the embodiment of the present invention.

MODES FOR CARRYING OUT THE INVENTION

An embodiment embodying the present invention is hereinafter described on the basis of the drawings.

The overall structure of an irreversible mechanism 1 according to the embodiment of the present invention is now described with reference to FIGS. 1 to 5.

Figure 1:
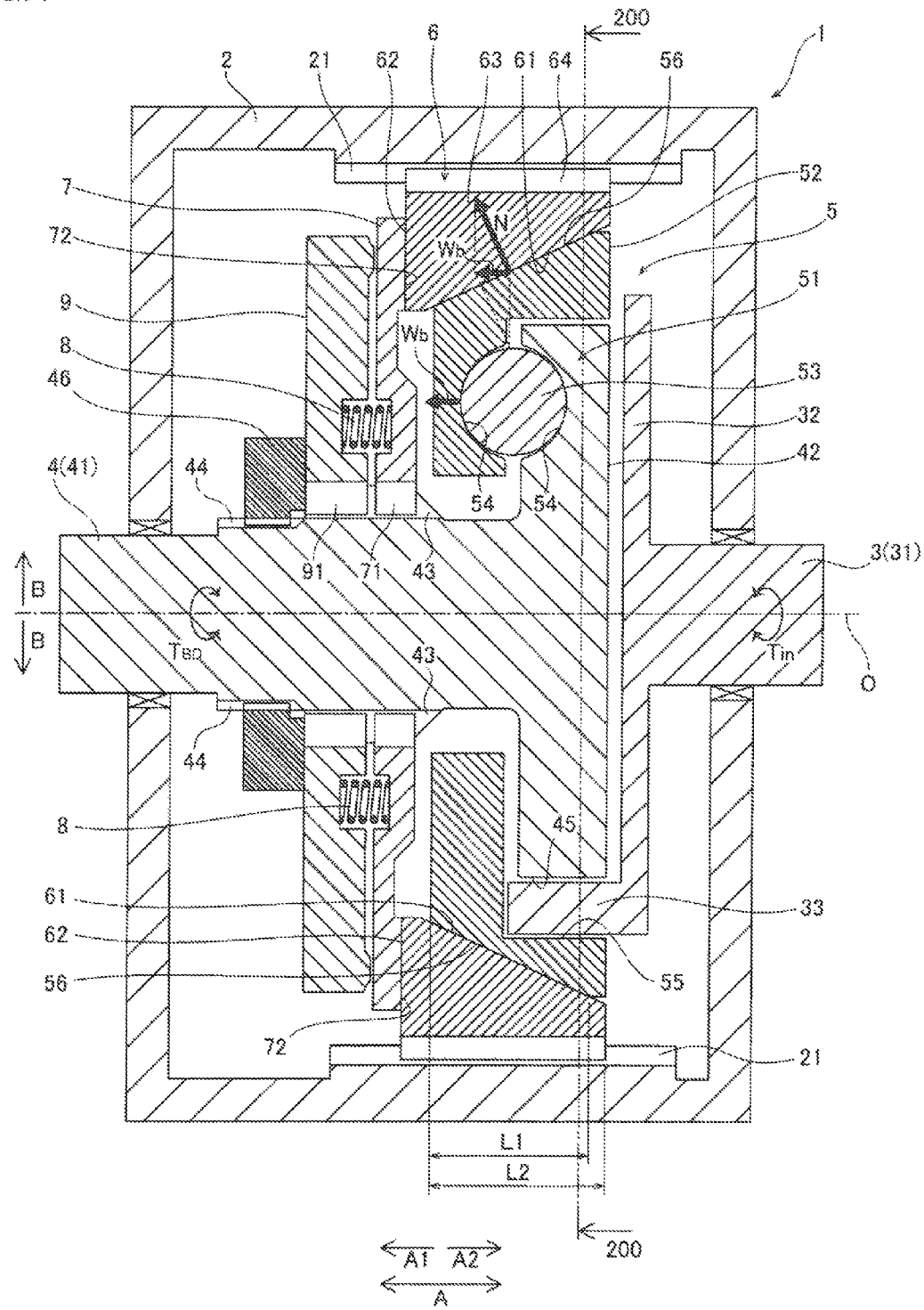
FIG. 1 A schematic longitudinal sectional view showing an irreversible mechanism according to an embodiment of the present invention.

As shown in FIG. 1, the irreversible mechanism 1 according to this embodiment is a mechanism that prevents transmission of back drive torque to an input shaft 3 side by preventing rotation of an output shaft 4 when the back drive torque acts on the output shaft 4 while transmitting drive torque input into an input shaft 3 to the output shaft 4. The input shaft 3 is connected to an unshown actuator side that generates the drive torque (input torque). The output shaft 4 is connected to a device, a machine element, or the like that is a transmission destination of the drive torque of an actuator. The back drive torque (hereinafter referred to as a BD torque) is torque that is generated in a device or a machine element on an output shaft 4 side and acts on the output shaft 4.

This irreversible mechanism is applied to a power transmission system of an aircraft, a general industrial machine, or the like. For example, in the aircraft, the irreversible mechanism is applicable to a rudder face (flap) drive system for steering or the like. The rudder face is rotated to a predetermined angle by driving of the actuator on the input shaft 3 side. Aerodynamic force acts on the rudder face in flight, and hence the BD torque acts on the output shaft 4 from a rudder face side by the aerodynamic force. In this case, the irreversible mechanism 1 has a function of maintaining a rudder face angle by preventing rotation of the output shaft 4 caused by the BD torque and a function of preventing transmission of the BD torque to the actuator (input shaft 3) side. The irreversible mechanism is also called a back-torque limiter.

The irreversible mechanism 1 according to this embodiment mainly includes a housing 2, the input shaft 3, the output shaft 4, a conversion mechanism 5, and a brake portion 6. The irreversible mechanism 1 further includes an output-side brake member 7, a preload spring 8, and a spring receiving member 9. The brake portion 6 is formed with a first brake surface 61 and a third brake surface 62. The conversion mechanism 5 is provided a second brake surface 56 that comes into contact with the first brake surface 61. The output-side brake member 7 is provided with a fourth brake surface 72 that comes into contact with the third brake surface 62. A direction A in which the rotation central axis O of the input shaft 3 and the output shaft 4 extends is hereinafter referred to as an axial direction. A radial direction orthogonal to the axial direction A and about the central axis O is shown as a direction B.

The housing 2 is a box-shaped member that stores the above portions. The housing 2 rotatably supports the input shaft 3 and the output shaft 4. The housing 2 includes a spline portion 21 that extends in the axial direction A on its inner peripheral surface.

Figure 2:
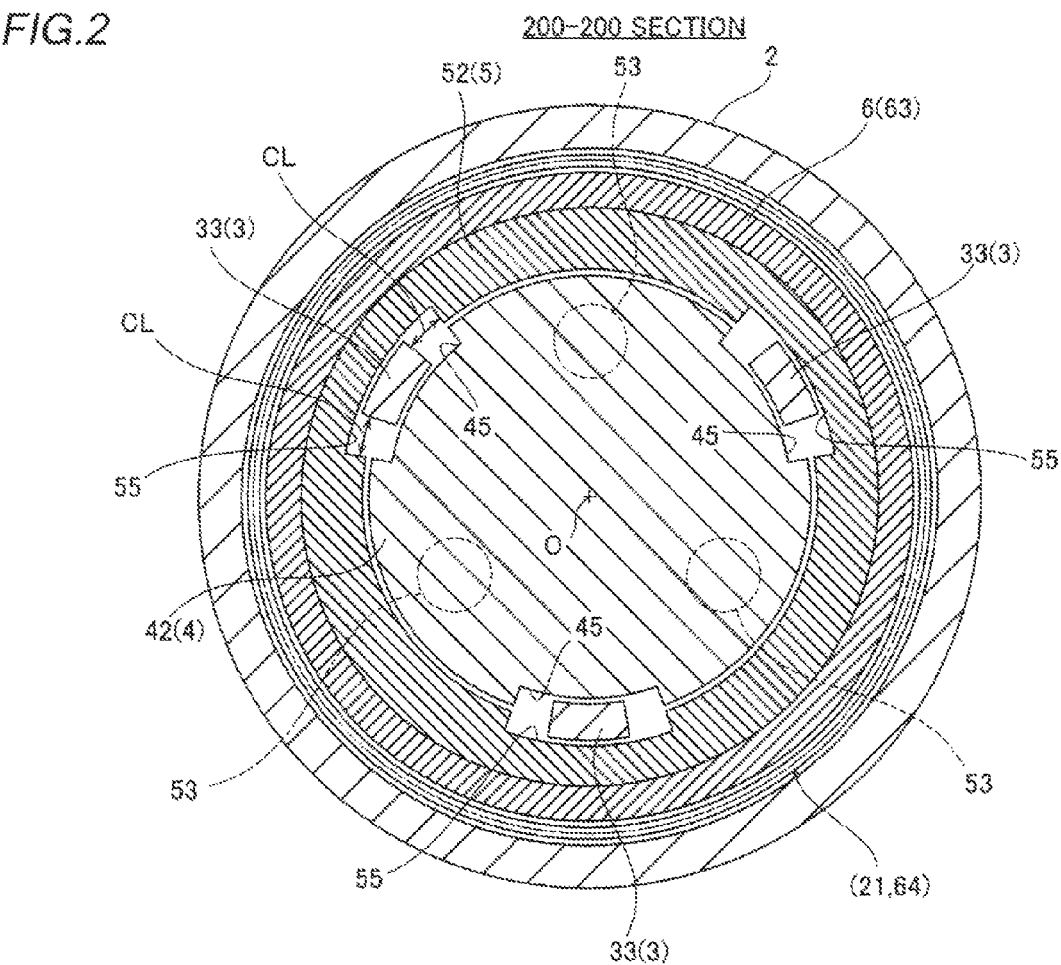
FIG. 2 A schematic sectional view taken along the line 200-200 in FIG. 1.

The input shaft 3 is a rotary shaft that includes a shaft portion 31, an input flange portion 32, and key portions 33. The shaft portion 31 is supported by the housing 2 to be rotatable about the central axis O. The input flange portion 32 is in the form of a circular disc (in an annular shape) that overhangs beyond a tip end of the shaft portion 31 on the output shaft 4 side (A1 side) in the radial direction B. The key portions 33 are columnar portions that protrude in the axial direction A toward the output shaft 4 side (A1 side) from an outer peripheral edge of the input flange portion 32. Multiple (three) key portions 33 are provided at equal angular intervals (about 120 degrees) in a rotational direction on the outer peripheral edge of the input flange portion 32, as shown in FIG. 2. The key portions 33 engage with both the output shaft 4 and the conversion mechanism 5 in the rotational direction with predetermined clearances CL, as described later. The key portions 33 have a function of transmitting the drive torque to the output shaft 4 and rotating the output shaft 4.

As shown in FIG. 1, the output shaft 4 is a rotary shaft (driven shaft) that rotates according to the input shaft 3. The output shaft 4 includes a shaft portion 41 and an output flange portion 42. The shaft portion 41 is supported by the housing 2 to be rotatable about the central axis O. On the outer peripheral portion of the shaft portion 41, a spline portion 43 that extends in the axial direction A and a screw portion 44 are formed. In the axial direction A, the spline portion 43 is provided at a position between the screw portion 44 and the output flange portion 42. The output flange portion 42 is in the form of a circular disc (in an annular shape) that overhangs beyond a tip end of the shaft portion 41 on the input shaft 3 side (A2 side) in the radial direction B. As shown in FIG. 2, on the outer periphery of the output flange portion 42, grooves (grooves in the radial direction) 45 that engage with the key portions 33 of the input shaft 3 are formed. Multiple (three) grooves 45 are provided at equal angular intervals (about 120 degrees) in a rotational direction in correspondence to the key portions 33. As described later, the output flange portion 42 also serves as a first cam portion 51 of the conversion mechanism 5.

As shown in FIG. 1, the conversion mechanism 5 is connected to the output shaft 4, and is configured to convert the BD torque from the output shaft 4 side to an axial force. The conversion mechanism 5 includes the first cam portion 51 provided on the output shaft 4 side, a second cam portion 52 provided on a second brake surface 56 side, and balls 53 arranged between the first cam portion 51 and the second cam portion 52. More specifically, the conversion mechanism 5 is a ball ramp mechanism that includes a pair of cam members (the first cam portion 51 and the second cam portion 52) including ball ramp portions 54 and the balls 53 arranged in the ball ramp portions 54 between the pair of cam members. The first cam portion 51 is an example of the "first member" or the "cam member" in the present invention, and the second cam portion 52 is an example of the "second member" or the "cam member" in the present invention. The balls 53 are examples of the "intermediate member" in the present invention.

The conversion mechanism 5 is configured to rotate integrally with the output shaft 4 during a driving state where the drive torque is input from the input shaft 3. The conversion mechanism 5 is configured to convert the BD torque to an axial force $W_b$ in the direction A and press the second brake surface 56 against the first brake surface 61 of the brake portion 6 when the BD torque acts on the output shaft 4.

Specifically, the first cam portion 51 is integrally formed in the output flange portion 42 of the output shaft 4. The first cam portion 51 includes ball ramp portions 54 formed on the A1-side surface of the output flange portion 42. The ball ramp portions 54 are recessed inclined surface portions into which the balls 53 are fitted, as shown in FIG. 3.

As shown in FIG. 1, the second cam portion 52 is an annular member (see FIG. 2) arranged on the outer peripheral side of the output shaft 4. The second cam portion 52 is recessed to store the output flange portion 42 inside. The second cam portion 52 includes ball ramp portions 54 formed at positions that face the first cam portion 51 (output flange portion 42) in the axial direction A. The second cam portion 52 is formed with grooves (grooves in the radial direction) 55 that engage with the key portions 33 of the input shaft 3, as shown in FIG. 2. Three grooves 55 are provided at equal angular intervals (about 120 degrees) in a rotational direction in correspondence to the key portions 33. The second cam portion 52 has an annular shape. As shown in FIG. 1, on the circumferential outer peripheral surface of the second cam portion 52, the second brake surface 56 is formed.

Thus, the second brake surface 56 is integrally provided on the second cam portion 52 of the conversion mechanism 5. More specifically, the outer peripheral surface of the second cam portion 52 includes a taper surface tapered in a direction A1, which is the action direction of the axial force $W_b$ of the conversion mechanism 5. On the outer peripheral surface of the second cam portion 52 including the taper surface, the second brake surface 56 is formed. The second brake surface 56 faces the first brake surface 61, and is provided to rotate integrally with the output shaft 4. The second brake surface 56 is formed over a range of an axial length L1 excluding the vicinity of an A2-side end on the outer peripheral surface of the second cam portion 52.

Figure 3:
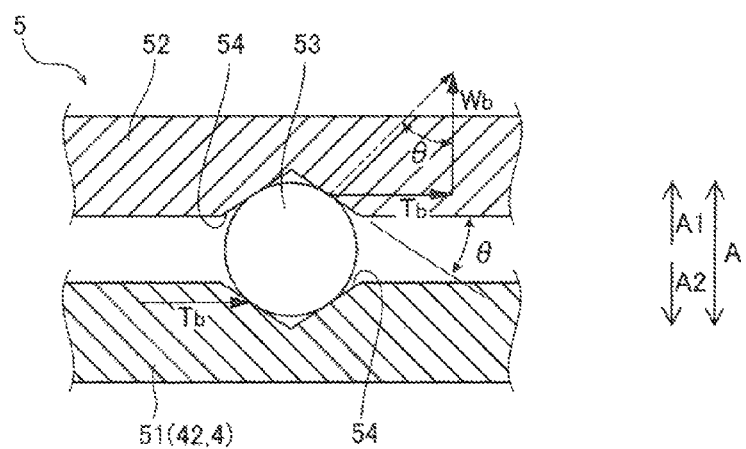
FIG. 3 A schematic view for illustrating a conversion mechanism.

The balls 53 are held between the first cam portion 51 and the second cam portion 52, assuming a state where the balls 53 are fitted into the ball ramp portions 54 of the first cam portion 51 and the ball ramp portions 54 of the second cam portion 52 as a stable state, as shown in FIG. 3. Multiple (three) balls 53 (and ball ramp portions 54) are provided at equal angular intervals (about 120 degrees) in the rotational direction, and are arranged at positions between the three key portions 33 (and grooves 45 and 55), respectively. In the stable state where the balls 53 are fitted into the ball ramp portions 54 (see FIG. 3), the grooves 45 of the output flange portion 42 (first cam portion 51) and the grooves 55 of the second cam portion 52 are configured such that rotation angular positions (rotational phases) thereof are coincident with each other, as shown in FIG. 2.

As shown in FIG. 3, the balls 53 roll onto the ball ramp portions 54 by torque $T_b$ from the first cam portion 51 and are displaced in the direction A1 (axial direction) when the BD torque acts on the output shaft 4. At this time, the grooves 45 of the output flange portion 42 (first cam portion 51) are displaced (rotated) with rotational phase differences PD (see FIG. 5) with respect to the grooves 55 of the second cam portion 52. The axial force $W_b$ in the direction A1 is generated by the displacement of the balls 53 in the direction A1 (axial direction). Consequently, the second brake surface 56 of the second cam portion 52 is pressed against the first brake surface 61 according to the axial force $W_b$ in the direction A1, as shown in FIG. 1. As shown in FIG. 2, the clearances CL between the key portions 33 of the input shaft 3 and the inner surfaces of the grooves 45 of the output flange portion 42 and the grooves 55 of the second cam portion 52 are configured to be capable of sufficiently absorbing the rotational phase differences PD between the output flange portion 42 (grooves 45) and the second cam portion 52 (grooves 55). In FIGS. 2 and 5 to 7 etc., the size of the clearances CL is exaggeratingly shown for convenience.

As shown in FIG. 1, the brake portion 6 is arranged at a position on the outer peripheral side (the outer side in the radial direction) of the output flange portion 42 of the output shaft 4 and the conversion mechanism 5 (the first cam portion 51, the second cam portion 52, and the balls 53). The brake portion 6 consists of a single member (main body portion 63) including the first brake surface 61 and the third brake surface 62. The main body portion 63 is annularly formed (see FIG. 2). The brake portion 6 includes a spline portion 64 that engages with the spline portion 21 of the housing 2 on the outer peripheral surface of the main body portion 63. Thus, the brake portion 6 is not rotatable about an axis and is movable in the axial direction A. Therefore, the first brake surface 61 and the third brake surface 62 both are not rotatable about the axis.

According to this embodiment, the first brake surface 61 is provided on the circumferential inner peripheral surface of the main body portion 63. In other words, the first brake surface 61 is circumferentially (annularly) formed. The first brake surface 61 is formed over the substantially entire length in the axial direction A on the inner peripheral surface of the main body portion 63. The first brake surface 61 includes a taper surface tapered in the direction A1 in which the axial force $W_b$ of the conversion mechanism 5 acts, similarly to the second brake surface 56.

The first brake surface 61 and the second brake surface 56 are inclined at constant taper angles. The taper angles of the first brake surface 61 and the second brake surface 56 are the same. Therefore, the first brake surface 61 and the second brake surface 56 are configured to generate friction torque (braking torque) while coming into surface contact with each other. The first brake surface 61 and the second brake surface 56 are configured to generate a larger normal force N as compared with the axial force $W_b$ by the boosting effect (wedge effect) of the taper surface. In a contact portion between the first brake surface 61 and the second brake surface 56, friction torque (braking torque) proportional to this normal force N and a distance (radius) from the central axis O is generated.

The first brake surface 61 and the second brake surface 56 are arranged outward of the balls 53 of the conversion mechanism 5 in the radial direction B. Furthermore, the first brake surface 61 and the second brake surface 56 are arranged outward of the first cam portion 51 of the conversion mechanism 5 (the output flange portion 42 of the output shaft 4) in the radial direction B. In the axial direction A, the first brake surface 61 and the second brake surface 56 are arranged at a position that overlaps with the conversion mechanism 5 in the axial direction A. The length of the contact portion between the first brake surface 61 and the second brake surface 56 in the axial direction A is L1. The length L1 is smaller than the length L2 of the conversion mechanism 5 in the axial direction A. The first brake surface 61 and the second brake surface 56 are arranged such that the contact portion is within a range of the length L2 of the conversion mechanism 5 in the axial direction A.

The third brake surface 62 is formed on a circumferential (annular) end face of the brake portion 6 on an output side (A1 side). More specifically, the third brake surface 62 includes a surface of the brake portion 6 along the radial direction B (a surface perpendicular to the axial direction A), and is circumferentially formed.

The output-side brake member 7 is arranged adjacently on an A1 direction side relative to the brake portion 6. The output-side brake member 7 includes a spline portion 71 that engages with the spline portion 43 of the output shaft 4 in its inner periphery. Thus, the output-side brake member 7 rotates integrally with the output shaft 4, and is relatively movable in the axial direction A with respect to the output shaft 4. The output-side brake member 7 is formed with the fourth brake surface 72 provided to rotate integrally with the output shaft 4 without the conversion mechanism 5 and pressed against the third brake surface 62 by the axial force $W_b$ of the conversion mechanism 5. The fourth brake surface 72 is formed on the A2-side surface of the output-side brake member 7 to face the third brake surface 62. The fourth brake surface 72 is circumferentially formed in correspondence to the third brake surface 62. The fourth brake surface 72 includes a surface (a surface perpendicular to the axial direction A) along the radial direction B, similarly to the third brake surface 62. The third brake surface 62 and the fourth brake surface 72 are arranged outward of the balls 53 of the conversion mechanism 5 in the radial direction B.

The preload spring 8 is a compression coil spring that generates an urging force in the axial direction A. The preload spring 8 is arranged between the output-side brake member 7 and the spring receiving member 9. This spring receiving member 9 supports one end of the preload spring 8 on the A1 direction side of the output-side brake member 7. The spring receiving member 9 includes a spline portion 91 that engages with the spline portion 43 of the output shaft 4 in its inner periphery. Thus, the spring receiving member 9 rotates integrally with the output shaft 4, and is relatively movable in the axial direction A with respect to the output shaft 4. On the A1 direction side of the spring receiving member 9, a fixing nut 46 fastened (screwed) to the screw portion 44 of the output shaft 4 is provided. The preload spring 8 urges the output-side brake member 7 in a direction A2 in a state where its A1 side is supported by the spring receiving member 9 and the fixing nut 46. The urging force of this preload spring 8 generates initial friction torque between the first brake surface 61 and the second brake surface 56 and prevents slipping (idling) between the first brake surface 61 and the second brake surface 56 at the time of generating the BD torque. The displacement of the balls 53 in the direction A1 at the time of generating the BD torque is absorbed by a slight clearance between the output-side brake member 7 and the spring receiving member 9. The axial force $W_b$ in the direction A1 is finally received by the fixing nut 46. An axial force (not shown) in the direction A2 that acts on a first cam portion 51 side as the reaction of the axial force $W_b$ is finally received by the fixing nut 46 through the output shaft 4. Movements of the irreversible mechanism 1 according to this embodiment are now described with reference to FIGS. 4 to 7.

(Movements for Preventing Transmission of BD Torque)

Movements of the irreversible mechanism 1 for preventing transmission of the torque to the input shaft 3 side (movements of the irreversible mechanism 1 during operation) when the BD torque acts on the output shaft 4 are now described.

Figure 4:
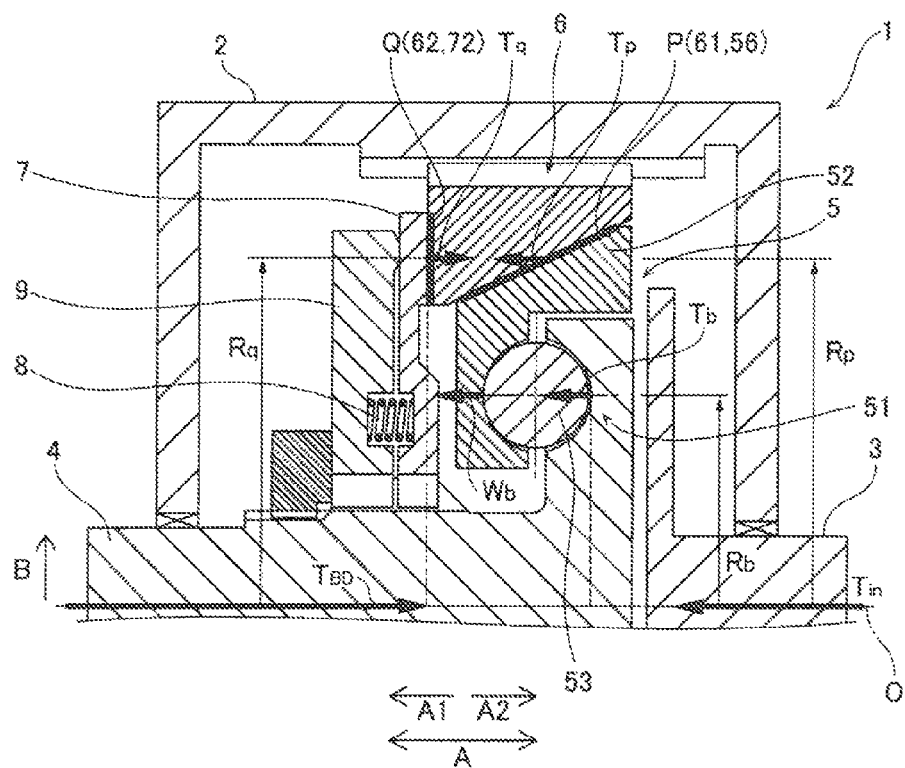
FIG. 4 A diagram for illustrating torque and an axial force that act in the irreversible mechanism shown in FIG. 1.

When the BD torque (rotary torque) acts on the output shaft 4, as shown in FIG. 4, the output shaft 4, the output-side brake member 7, and the spring receiving member 9 are driven by BD torque $T_{BD}$ to rotate with respect to the housing 2 and the brake portion 6. At this time, initial friction torque is generated between the first brake surface 61 and the second brake surface 56 (serving as a friction surface P) according to the urging force of the preload spring 8, and the second cam portion 52 is braked. Furthermore, initial friction torque is generated between the third brake surface 62 and the fourth brake surface 72 (serving as a friction surface Q) according to the urging force of the preload spring 8.

On the other hand, the BD torque $T_{BD}$ acts on the output shaft 4, and hence the torque $T_b$ is input into the balls 53 of the conversion mechanism 5. Thus, the first cam portion 51 on the output shaft 4 side is displaced to generate the rotational phase differences PD (see FIG. 5) with respect to the second cam portion 52. Consequently, the axial force $W_b$ in the direction A1 is generated.

The second brake surface 56 is pressed against the first brake surface 61 in the direction A1 by the axial force $W_b$ that acts on the second cam portion 52. Thus, friction torque (braking torque) $T_p$ is generated on the friction surface P. On the friction surface P, larger friction torque $T_p$ as compared with the case where the axial force $W_b$ simply acts on the friction surface P is generated by the boosting effect (wedge effect) of the taper surface. When the BD torque $T_{BD}$ is increased, the torque $T_b$ input from the first cam portion 51 into the balls 53 is increased. Consequently, the axial force $W_b$ that acts on the second cam portion 52 is increased, and hence the friction torque $T_p$ generated on the friction surface P is further increased.

The positions (average radii $R_p$) in the radial direction B, contact area (length L1 in the axial direction A), taper angles, friction coefficients, etc. of the first brake surface 61 and the second brake surface 56 (friction surface P) are set such that the generated friction torque $T_p$ is larger than an acceptable value of the BD torque (a maximum value of $T_{BD}$). Thus, a state where the friction torque $T_p$ on the friction surface P is constantly larger than the BD torque $T_{BD}$ is maintained, and rotation of the output shaft 4 is prevented. Furthermore, rotation of the output shaft 4 is prevented, and hence transmission of the torque (rotation) to the input shaft 3 side is prevented. The above movements are similar even when the BD torque $T_{BD}$ acts in any rotational direction. A direction in which the rotational phase differences PD of the first cam portion 51 with respect to the second cam portion 52 are generated is only changed by the rotational direction.

Movements for driving the input shaft 3 during operation of the irreversible mechanism 1 (when the BD torque acts on the output shaft 4) are now described. The case where drive torque $T_{in}$ is input in the same direction as the action direction of the BD torque $T_{BD}$ is referred to as assistance driving. The case where drive torque $T_{in}$ is input in a direction opposite to the action direction of the BD torque $T_{BD}$ is referred to as resistance driving.

(Movements During Assistance Driving)

Figure 5:
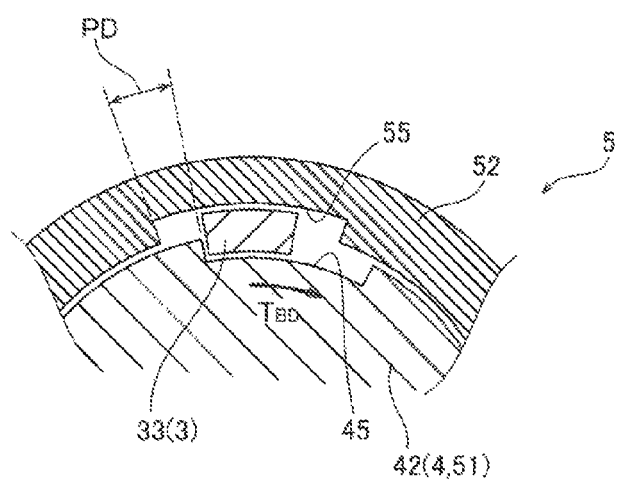
FIG. 5 A schematic view showing a state where a rotational phase difference is generated between a first cam portion and a second cam portion of the conversion mechanism during operation of the irreversible mechanism.

In the case of the assistance driving, the irreversible mechanism 1 is in an operating state, and hence the first cam portion 51 has the rotational phase differences PD with respect to the second cam portion 52, as shown in FIG. 5. The case where the BD torque $T_{BD}$ acts in a clockwise direction in FIG. 5 and the input shaft 3 is driven in the same clockwise direction is described here.

Figure 6:
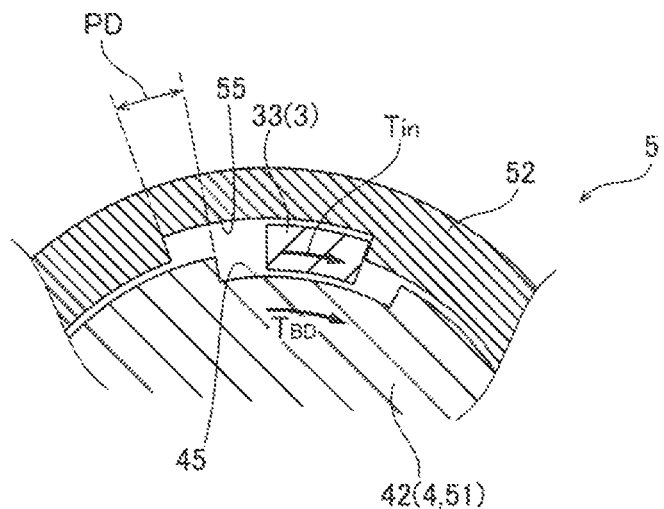
FIG. 6 A schematic view for illustrating the case of performing assistance driving of the irreversible mechanism in FIG. 5.

When the input shaft 3 is driven (rotated) in the clockwise direction, the key portions 33 of the input shaft 3 come into contact with the inner surfaces of the grooves 55 of the second cam portion 52 without coming into contact with the first cam portion 51, as shown in FIG. 6. Thus, the drive torque $T_{in}$ of the input shaft 3 does not act on the first cam portion 51 but directly acts on the second cam portion 52. As shown in FIG. 4, the torque $T_b$ input into the balls 53 by the BD torque $T_{BD}$ and the drive torque $T_{in}$ (see FIG. 6) act in the same direction, but the friction torque $T_p$ on the friction surface P acts in an opposite direction. Thus, the second cam portion 52 is rotated by driving the input shaft 3 at the drive torque $T_{in}$ having magnitude corresponding to a difference between the torque $T_b$ and the friction torque $T_p$.

In the case of the assistance driving, even when the second cam portion 52 starts to rotate, the BD torque $T_{BD}$ continues to act on the output shaft 4 (first cam portion 51) side. Thus, the output shaft 4 rotates by an amount corresponding to rotation of the second cam portion 52 in a state where the first cam portion 51 and the second cam portion 52 have the rotational phase differences PD, as shown in FIG. 6.

(Movements During Resistance Driving)

Also in the case of the resistance driving, the irreversible mechanism 1 is in an operating state, and hence the first cam portion 51 has the rotational phase differences PD with respect to the second cam portion 52, as shown in FIG. 5. The case where the BD torque $T_{BD}$ acts in the clockwise direction shown in FIG. 5 and the input shaft 3 is driven in a counterclockwise direction is described here.

Figure 7:
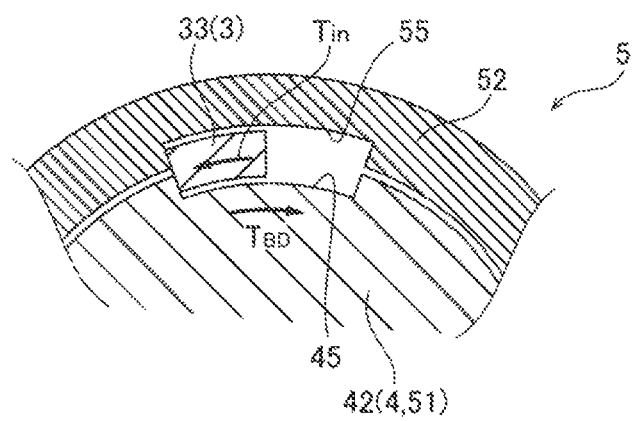
FIG. 7 A schematic view for illustrating the case of performing resistance driving of the irreversible mechanism in FIG. 5.

When the input shaft 3 is driven (rotated) in the counterclockwise direction, the key portions 33 of the input shaft 3 come into contact with the inner surfaces of the grooves 45 of the first cam portion 51 without coming into contact with the second cam portion 52. Thus, the drive torque $T_{in}$ of the input shaft 3 does not act on the second cam portion 52 but directly acts on the first cam portion 51. The first cam portion 51 is rotated by the drive torque $T_{in}$ so that the rotational phase differences PD between the first cam portion 51 and the second cam portion 52 are canceled, as shown in FIG. 7. Consequently, the axial force $W_b$ disappears, and the friction torque $T_p$ on the friction surface P is released. Thus, the output shaft 4 and the conversion mechanism 5 (second cam portion 52) integrally rotate.

After the rotational phase differences PD are canceled, the key portions 33 come into contact with both the inner peripheral surfaces of the grooves 45 and the inner peripheral surfaces of the grooves 55, and rotate both the output shaft 4 and the second cam portion 52. The output shaft 4 can be rotated by driving the input shaft 3 at the drive torque $T_{in}$ corresponding to the total of the BD torque $T_{BD}$ and the initial friction torque according to the urging force of the preload spring 8. The above movements are similar even when the BD torque $T_{BD}$ acts in any rotational direction.

When the BD torque $T_{BD}$ does not act, the input shaft 3 is driven in the stable state where no rotational phase difference PD is generated between the first cam portion 51 and the second cam portion 52. In this case, the movements are the same as the movements during the resistance driving after the cancellation of the rotational phase differences PD shown in FIG. 7, except that the BD torque $T_{BD}$ does not act.

The action of the third brake surface 62 and the fourth brake surface 72 (the action of the friction surface P) of the irreversible mechanism 1 according to this embodiment is now described.

As shown in FIG. 4, in the case of the assistance driving, the magnitude of the torque $T_b$ input into the balls 53 corresponds to a difference between the BD torque $T_{BD}$ and friction torque $T_q$ generated on the friction surface Q. In other words, the third brake surface 62 and the fourth brake surface 72 are provided so that the torque $T_b$ input into the balls 53 is reduced. As can be seen from FIG. 3, when the torque $T_b$ input into the balls 53 is reduced, the axial force $W_b$ is reduced accordingly, and the friction torque $T_p$ generated on the friction surface P is reduced. Therefore, the torque $T_b$ input into the balls 53 and the friction torque $T_p$ generated on the friction surface P can be reduced relative to the generated BD torque $T_{BD}$.

Specifically, the torque $T_b$ input into the balls 53 is expressed by the following formula (1) with the BD torque $T_{BD}$ and the friction torque $T_q$ on the friction surface Q.

$$T_b = T_{BD} - T_q \tag{1}$$

The friction torque $T_q$ on the friction surface Q is expressed by the following formula (2).

$$T_q = \mu \times R_q \times W_b \tag{2}$$

Here, $\mu$ is a friction coefficient of the friction surface Q. $R_q$ (see FIG. 4) is an average distance (radius) from the rotation axis to the friction surface Q. $W_b$ is an axial force of the conversion mechanism 5 generated by the torque $T_b$ input into the balls 53.

The axial force $W_b$ is expressed by the following formula (3), as can be seen from FIGS. 3 and 4.

$$W_b = T_b / (R_b \times \tan \theta) \tag{3}$$

Here, $R_b$ is a distance (radius) from the rotation axis to the center of each of the balls 53. $\theta$ is the inclined angle of each of the ball ramp portions 54.

The following formula (4) is obtained from the above formulas (1) to (3).

$$T_b = T_{BD} \times R_b \times \tan \theta / (R_b \times \tan \theta + \mu \times R_q) = T_{BD} \times \alpha / (\alpha + \mu \times R_q) \tag{4}$$

Note that $\alpha = R_b \times \tan \theta$ (constant).

It has been proved from the above formula (4) that the friction surface Q (the third brake surface 62 and the fourth brake surface 72) is provided so that the torque $T_b$ input into the balls 53 is reduced by the denominator ($\mu \times R_q$) of the right side of the formula (4). Furthermore, the friction torque $T_p$ on the friction surface P (the first brake surface 61 and the second brake surface 56) is generated according to the axial force $W_b$ generated by the torque $T_b$, and hence the friction torque $T_p$ on the friction surface P is also reduced.

The drive torque $T_{in}$ during assistance operation is expressed by the following formula (5).

$$T_{in} = T_p = T_b \tag{5}$$

Both the friction torque $T_p$ and the torque $T_b$ input into the balls 53 are reduced by the friction surface Q (the third brake surface 62 and the fourth brake surface 72). Thus, even when the friction coefficient of the friction surface P is fluctuated, for example, the fluctuation range of the friction torque $T_p$ can be suppressed to be small. Consequently, fluctuation in the drive torque $T_{in}$ required during the assistance driving is suppressed to be small.

According to this embodiment, the following effects can be obtained.

According to this embodiment, as hereinabove described, the brake portion 6 that includes the first brake surface 61 and is unrotatably provided is provided in the irreversible mechanism 1. Furthermore, the second brake surface 56 that faces the first brake surface 61, is provided to rotate integrally with the output shaft 4, and is pressed against the first brake surface 61 according to the axial force $W_b$ of the conversion mechanism 5 is provided on the irreversible mechanism 1. The first brake surface 61 and the second brake surface 56 include the taper surfaces tapered in the action direction of the axial force $W_b$ of the conversion mechanism 5. Thus, large friction torque (braking torque) $T_p$ can be generated between the first brake surface 61 and the second brake surface 56 on the output shaft 4 side by the boosting effect of the taper surfaces. Thus, sufficient friction torque (braking torque) $T_p$ can be generated without providing a number of friction plates. Consequently, according to this embodiment, the structure of the irreversible mechanism 1 can be simplified by suppressing an increase in the number of components, and the entire length of the irreversible mechanism 1 in the axial direction A can be reduced. Thus, the weight of the irreversible mechanism 1 can be reduced by reducing the entire length of the irreversible mechanism 1, and the reliability of the irreversible mechanism 1 can be improved by simplifying the structure. Therefore, according to this embodiment, the irreversible mechanism 1 suitable to be mounted on an aircraft, which meets a requirement specific to the aircraft field in which the emphasis is particularly on fuel consumption and safety, can be provided.

According to this embodiment, as hereinabove described, the conversion mechanism 5 including the first cam portion 51 provided on the output shaft 4 side, the second cam portion 52 provided on the second brake surface 56 side, and the balls 53 arranged between the first cam portion 51 and the second cam portion 52 is provided. Furthermore, the first brake surface 61 and the second brake surface 56 are arranged outward of the balls 53 in the radial direction B. Thus, the distance (radius $R_p$) of the first brake surface 61 and the second brake surface 56 from the output shaft 4 can be increased. Consequently, the friction torque $T_p$ can be increased. Thus, larger friction torque (braking torque) $T_p$ can be generated while the simplified structure having a reduced entire length in the axial direction A is achieved.

According to this embodiment, as hereinabove described, the first brake surface 61 and the second brake surface 56 are arranged at the position that overlaps with the conversion mechanism 5 in the axial direction A. Thus, the entire length of the irreversible mechanism 1 in the axial direction A can be further reduced.

According to this embodiment, as hereinabove described, the second brake surface 56 is integrally provided on the second cam portion 52 of the conversion mechanism 5. Thus, it is not necessary to separately provide a brake member formed with the second brake surface 56, and hence the number of components can be reduced.

According to this embodiment, as hereinabove described, the conversion mechanism 5 includes the ball ramp mechanism that includes the pair of cam members (the first cam portion 51 and the second cam portion 52) including the ball ramp portions 54 and the balls 53 arranged in the ball ramp portions 54 between the first cam portion 51 and the second cam portion 52. Furthermore, the first brake surface 61 is provided on the circumferential inner peripheral surface of the brake portion 6 (main body portion 63). Moreover, the second brake surface 56 is formed on the circumferential outer peripheral surface of the second cam portion 52. Thus, a structure to convert the BD torque $T_{BD}$ to the axial force $W_b$ can be easily and compactly obtained with the ball ramp mechanism. In addition, a contact area between the first brake surface 61 and the second brake surface 56 can be easily increased. Thus, even when large friction torque $T_p$ is generated, an increase in a contact surface pressure between the first brake surface 61 and the second brake surface 56 can be effectively suppressed.

According to this embodiment, as hereinabove described, the third brake surface 62 unrotatably provided is provided on the irreversible mechanism 1. Furthermore, the fourth brake surface 72 provided to rotate integrally with the output shaft 4 without the conversion mechanism 5 and pressed against the third brake surface 62 by the axial force $W_b$ of the conversion mechanism 5 is provided on the irreversible mechanism 1. Thus, as described above, fluctuation in the drive torque $T_{in}$ during the assistance driving can be suppressed.

According to this embodiment, as hereinabove described, the first brake surface 61 and the third brake surface 62 each are provided on the brake portion 6. Thus, even when the third brake surface 62 in addition to the first brake surface 61 is provided, an increase in the number of components can be suppressed.

According to this embodiment, as hereinabove described, the brake portion 6 consists of the single member (main body portion 63). Thus, an increase in the number of components can be suppressed unlike a structure including a multi-plate brake. Consequently, the structure can be further simplified.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the example of integrally forming the first cam portion 51 of the conversion mechanism 5 in the output flange portion 42 of the output shaft 4 has been shown in the aforementioned embodiment, the present invention is not restricted to this. The first cam portion 51 may not be formed integrally with the output shaft 4. More specifically, the first cam portion 51 may be formed separately from the output flange portion 42, and the annular first cam portion 51 may be mounted on the A1-side surface of the output flange portion 42. Alternatively, the annular first cam portion 51 and the output flange portion 42 may be formed separately from the output shaft 4, and the first cam portion 51 and the output flange portion 42 may be mounted on the shaft portion 41 of the output shaft 4.

While the example in which the conversion mechanism 5 includes the ball ramp mechanism has been shown in the aforementioned embodiment, the present invention is not restricted to this. According to the present invention, the conversion mechanism can be any suitable mechanism so far as the same is a mechanism to convert the BD torque (rotation of the output shaft) to the axial force. The conversion mechanism may be a ball screw mechanism to convert the BD torque of the output shaft to the axial force, for example.

While the example of integrally forming the second brake surface 56 on the second cam portion 52 of the conversion mechanism 5 has been shown in the aforementioned embodiment, a second cam portion 152 and a second brake surface 156 may be formed separately from each other as in a modification shown in FIG. 8. More specifically, a brake member 157 including the second brake surface 156 may be mounted on the outer periphery of the second cam portion 152. Thus, the effect of increasing the friction torque $T_p$ similar to the aforementioned embodiment can be achieved from the wedge effect between the second brake surface 156 and the first brake surface 61 (friction surface P). However, in the case of this modification, the number of components is increased by providing the brake member 157. Thus, it is preferable to integrally form the second brake surface 56 on the second cam portion 52 as in the aforementioned embodiment in terms of a reduction in the number of components.

While the example of arranging the first brake surface 61 and the second brake surface 56 at the position that overlaps with the conversion mechanism in the axial direction A has been shown in the aforementioned embodiment, the present invention is not restricted to this. According to the present invention, in the axial direction A, the first brake surface 61 and the second brake surface 56 may be arranged at a position that does not overlap with the conversion mechanism 5. For example, the first brake surface 61 and the second brake surface 56 may be arranged on the A1 direction side (the A1 direction side of the second cam portion 52) of the balls 53 of the conversion mechanism 5. However, in this case, the entire length of the irreversible mechanism 1 in the axial direction A is likely to be increased. Thus, in order to reduce the entire length in the axial direction A, the first brake surface 61 and the second brake surface 56 are preferably arranged at the position that overlaps with the conversion mechanism 5 in the axial direction A as in the aforementioned embodiment.

While the example of providing the third brake surface 62 and the fourth brake surface 72 on the irreversible mechanism 1 has been shown in the aforementioned embodiment, the present invention is not restricted to this. According to the present invention, the third brake surface and the fourth brake surface may not be provided.

While the example in which the third brake surface 62 and the fourth brake surface 72 include the surfaces along the radial direction B (the surfaces perpendicular to the axial direction A) has been shown in the aforementioned embodiment, the present invention is not restricted to this. According to the present invention, a third brake surface 162 and a fourth brake surface 172 may include taper surfaces similarly to the first and second brake surfaces, as in the modification shown in FIG. 8. Thus, the effect of increasing the friction torque $T_q$ can be achieved from the boosting effect even between the third brake surface 162 and the fourth brake surface 172 (friction surface Q).

While the example of integrally forming the first brake surface 61 and the third brake surface 62 on the main body portion 63 of the brake portion 6 has been shown in the aforementioned embodiment, the present invention is not restricted to this. According to the present invention, the brake portion may include multiple members so that the first brake surface 61 and the third brake surface 62 are separate from each other. For example, in the modification shown in FIG. 8, a main body portion 163 of a brake portion 106 may be divided by a broken line S. In this case, the number of components is increased by providing an individual brake member. Thus, it is preferable to integrally form the first brake surface 61 and the third brake surface 62 on the brake portion 6 as in the aforementioned embodiment in terms of a reduction in the number of components.

DESCRIPTION OF REFERENCE SIGNS

1 Irreversible mechanism
3 Input shaft
4 Output shaft
5 Conversion mechanism
6 Brake portion
51 First cam portion (first member, cam member)
52 Second cam portion (second member, cam member)
53 Ball (intermediate member)
54 Ball ramp portion
56 Second brake surface
61 First brake surface
62 Third brake surface
72 Fourth brake surface
$T_{ED}$ Back drive (BD) torque
$W_b$ Axial force

The invention claimed is:

1. An irreversible mechanism comprising:
a rotatable input shaft;
an output shaft that rotates according to the input shaft;
a housing that rotatably supports the input shaft and the output shaft;
a conversion mechanism that is connected to the output shaft and converts back drive torque from an output shaft side to an axial force;
a brake portion that includes a main body portion including a first brake surface and a spline portion that engages with a spline portion of the housing on the outer peripheral surface of the main body portion and is unrotatably provided; and
a second brake surface that faces the first brake surface, is provided to rotate integrally with the output shaft, and is pressed against the first brake surface according to the axial force of the conversion mechanism, wherein
the first brake surface and the second brake surface include taper surfaces tapered in an action direction of the axial force of the conversion mechanism,
the conversion mechanism converts the back drive torque in both one rotational direction and the other rotational direction from the output shaft side to the axial force.

2. The irreversible mechanism according to claim 1, wherein
the conversion mechanism includes a first member provided on the output shaft side, a second member provided on a second brake surface side, and an intermediate member arranged between the first member and the second member, and
the first brake surface and the second brake surface are arranged outward of the intermediate member in a radial direction.

3. The irreversible mechanism according to claim 2, wherein
the first brake surface and the second brake surface are arranged at a position that overlaps with the conversion mechanism in an axial direction.

4. The irreversible mechanism according to claim 3, wherein
the second brake surface is integrally provided on the second member of the conversion mechanism.

5. The irreversible mechanism according to claim 4, wherein
the conversion mechanism is a ball ramp mechanism that includes a pair of cam members including ball ramp portions as the first member and the second member and a ball arranged in the ball ramp portions between the pair of cam members as the intermediate member,
the first brake surface is provided on a circumferential inner peripheral surface of the brake portion, and
the second brake surface is formed on a circumferential outer peripheral surface of one of the cam members.

6. An irreversible mechanism comprising:
a rotatable input shaft;
an output shaft that rotates according to the input shaft;
a conversion mechanism that is connected to the output shaft and converts back drive torque from an output shaft side to an axial force;
a brake portion that includes a first brake surface and is unrotatably provided;
a second brake surface that faces the first brake surface, is provided to rotate integrally with the output shaft, and is pressed against the first brake surface according to the axial force of the conversion mechanism;
a third brake surface unrotatably provided; and
a fourth brake surface provided to rotate integrally with the output shaft without the conversion mechanism and pressed against the third brake surface by the axial force of the conversion mechanism, wherein
the first brake surface and the second brake surface include taper surfaces tapered in an action direction of the axial force of the conversion mechanism, and
the conversion mechanism converts the back drive torque in both one rotational direction and the other rotational direction from the output shaft side to the axial force.

7. The irreversible mechanism according to claim 6, wherein
the first brake surface and the third brake surface each are provided on the brake portion.

8. An irreversible mechanism comprising:
a rotatable input shaft;
an output shaft that rotates according to the input shaft;
a conversion mechanism that is connected to the output shaft and converts back drive torque from an output shaft side to an axial force;
a brake portion that includes a first brake surface and is unrotatably provided; and
a second brake surface that faces the first brake surface, is provided to rotate integrally with the output shaft, and is pressed against the first brake surface according to the axial force of the conversion mechanism, wherein
the first brake surface and the second brake surface include taper surfaces tapered in an action direction of the axial force of the conversion mechanism,
the conversion mechanism converts the back drive torque in both one rotational direction and the other rotational direction from the output shaft side to the axial force, and
the brake portion consists of a single member.

9. The irreversible mechanism according to claim 6, wherein
the conversion mechanism includes a first member provided on the output shaft side, a second member provided on a second brake surface side, and an intermediate member arranged between the first member and the second member, and
the first brake surface and the second brake surface are arranged outward of the intermediate member in a radial direction.

10. The irreversible mechanism according to claim 9, wherein
the first brake surface and the second brake surface are arranged at a position that overlaps with the conversion mechanism in an axial direction.

11. The irreversible mechanism according to claim 10, wherein
the second brake surface is integrally provided on the second member of the conversion mechanism.

12. The irreversible mechanism according to claim 11, wherein
the conversion mechanism is a ball ramp mechanism that includes a pair of cam members including ball ramp portions as the first member and the second member and a ball arranged in the ball ramp portions between the pair of cam members as the intermediate member,
the first brake surface is provided on a circumferential inner peripheral surface of the brake portion, and
the second brake surface is formed on a circumferential outer peripheral surface of one of the cam members.

13. The irreversible mechanism according to claim 8, wherein
the conversion mechanism includes a first member provided on the output shaft side, a second member provided on a second brake surface side, and an intermediate member arranged between the first member and the second member, and
the first brake surface and the second brake surface are arranged outward of the intermediate member in a radial direction.

14. The irreversible mechanism according to claim 13, wherein
the first brake surface and the second brake surface are arranged at a position that overlaps with the conversion mechanism in an axial direction.

15. The irreversible mechanism according to claim 14, wherein
the second brake surface is integrally provided on the second member of the conversion mechanism.

16. The irreversible mechanism according to claim 15, wherein
the conversion mechanism is a ball ramp mechanism that includes a pair of cam members including ball ramp portions as the first member and the second member and a ball arranged in the ball ramp portions between the pair of cam members as the intermediate member,
the first brake surface is provided on a circumferential inner peripheral surface of the brake portion, and
the second brake surface is formed on a circumferential outer peripheral surface of one of the cam members.

17. An irreversible mechanism comprising:
a rotatable input shaft;
an output shaft that rotates according to the input shaft;
a conversion mechanism that is connected to the output shaft and converts back drive torque from an output shaft side to an axial force;
a brake portion that includes a first brake surface and is unrotatably provided; and
a second brake surface that faces the first brake surface, is provided to rotate integrally with the output shaft, and is pressed against the first brake surface according to the axial force of the conversion mechanism, wherein:
the first brake surface and the second brake surface include taper surfaces tapered in an action direction of the axial force of the conversion mechanism,
the conversion mechanism includes a first member provided on the output shaft side, a second member provided on a second brake surface side, and an intermediate member arranged between the first member and the second member, and
the second member includes a recessed portion configured to store the first member inside of said recessed portion in an axial direction.

18. The irreversible mechanism according to claim 17, wherein the intermediate member is being held in a contact state with each of the second member and the first member stored in said recessed portion of the second member.

* * * * *